Nov. 5, 1946.        L. M. WHEELER        2,410,696
HEIGHT MEASURING SCALE
Filed July 26, 1944
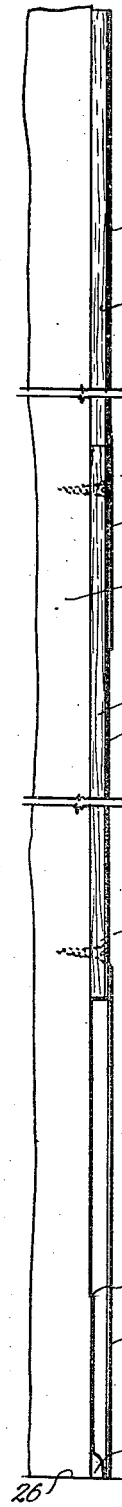
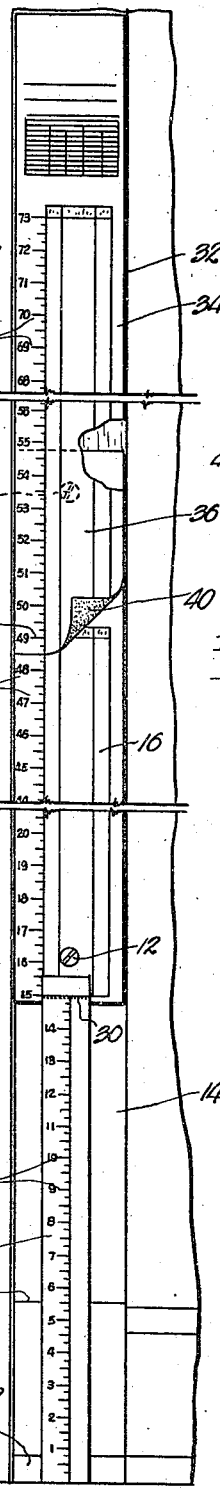
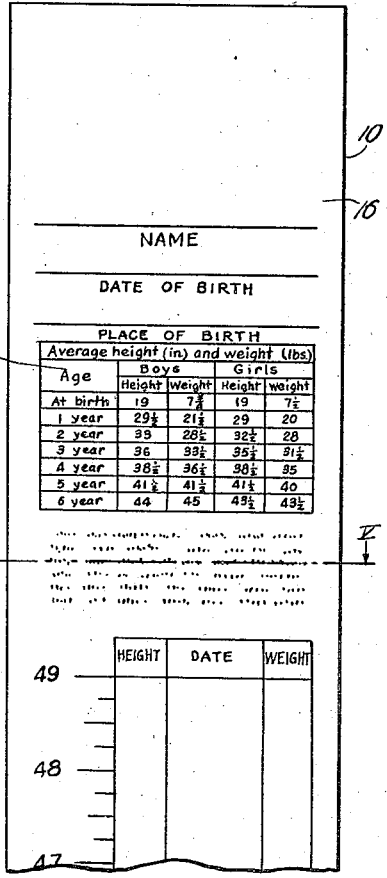
| Average height (in) and weight (lbs) | | | | |
|---|---|---|---|---|
| Age | Boys | | Girls | |
|  | Height | Weight | Height | Weight |
| At birth | 19 | 7¾ | 19 | 7½ |
| 1 year | 29½ | 21½ | 29 | 20 |
| 2 year | 33 | 28½ | 32½ | 28 |
| 3 year | 36 | 33½ | 35½ | 31½ |
| 4 year | 38½ | 36¾ | 38½ | 35 |
| 5 year | 41½ | 41½ | 41½ | 40 |
| 6 year | 44 | 45 | 43½ | 43½ |
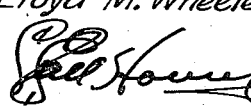
INVENTOR.
Lloyd M. Wheeler
BY
ATTORNEY.

Patented Nov. 5, 1946

2,410,696

UNITED STATES PATENT OFFICE 2,410,696

HEIGHT MEASURING SCALE

Lloyd M. Wheeler, Kansas City, Mo.

Application July 26, 1944, Serial No. 546,652

8 Claims. (Cl. 33—107)

This invention relates to measuring scales of the character attachable to vertical surfaces, such as the wall of a building or room, and has for a primary aim to provide an instrument of that character that has an attachable primary panel, a supplemental panel, and means for locating the primary panel on the particular portion of the wall at a predetermined distance above the floor as the securing means is moved to place.

It has heretofore been the practice for parents of growing children to maintain a record on some portion of a vertical wall in the home, of the rate of growth. Due to changing conditions with respect to redecoration and moving from one dwelling to another, these charts are often times lost or destroyed, and since the same are of importance and cannot be replaced, it is an object of this invention to provide a permanent recording device, attachable to door casings or the like, and having auxiliary parts, as will hereinafter more fully be described.

A primary aim of the invention is to provide a measuring scale of the type above identified, that is equipped with detachable means for affixing the primary indicia bearing panel of the scale in a predetermined position above the floor where the indicia of the scale accurately represent the height above the floor surface.

This invention has for a yet further aim, to provide a measuring scale composed of a number of sections, one of which is flexible and detachably secured to one end of the primary panel or section, and that is detached and discarded after the primary scale is secured in operative position with its lowermost end a distance above the floor equal to the length of the flexible section.

Another object of the invention is to provide a measuring scale having the aforesaid primary section and removable section, and that is further equipped with a supplemental panel provided with a facing of sheet material extending beyond one end of the supplemental panel, adapted to overlap the primary panel and having indicia of identical nature and in register wtih certain indicia of the underlying primary panel when the supplemental panel is in place.

Other objects of the invention will appear during the course of the following specification, referring to the accompanying drawing, wherein:

Fig. 1 is an edge elevational view of a height measuring scale made in accordance with the present invention and showing the same attached to a supporting vertical surface.

Fig. 2 is a face plan view of the scale and all of its component parts.

Fig. 3 is a fragmentary edge elevational view of a portion of the scale showing the flexible section thereof rebent upon the primary panel.

Fig. 4 is an enlarged fragmentary detailed plan view of one section of the scale; and Fig. 5 is a cross sectional vew taken on line V—V of Fig. 4.

In the preferred commercial embodiment, the invention may be built into a scale comprising a primary panel 10 formed of a strip of wood substantially ½ in. in thickness, and provided with screws or analogous means 12 for attachment to the vertical face of a wall or woodwork, generally designated by the numeral 14.

One face of panel 10 is covered by a sheet of material 16 having indicia 18 thereon, representing a scale in inches. This sheet of material 16 has a longitudinally extending tongue 20 of a length sufficient to mount panel 10 above any moldings 22 or offsets 24 that may be present on the wall 14 near the floor line 26.

Primary panel 10 has the indicia 18 thereon in scaled continuation of indicia 28 of flexible section 20. The free end of section 20 has the scale #1 adjacent thereto, as illustrated in Fig. 2. A line of weakness represented by the numeral 30 is formed transversely across flexible section 20 at the zone of connection between panel 10 and said section 20—all for the purpose as will be more fully hereinafter set down.

A supplemental panel 32 having means similar to those employed for fastening panel 10 in place, is a part of the complete assembly. This supplemental panel 32 has a facing of sheet material 34 along one surface thereof and this sheet of material is extended beyond one end of panel 34 to present a portion 36 adapted to overlap a part of the face of primary panel 10 when the supplemental panel 32 is to be used.

Indicia 38 on the face of sheet material 34 is set off in inch graduations and the indicia 38 on the extended portion 36 are identical to and overlie the indicia 18 on panel 10 when the supplemental panel has its end in abutting relation with one end of panel 10, as illustrated in Figs. 1 and 2.

Adhesive material 40 covers the underside of extended portion 36 so that when supplemental panel 32 is put into use the extended portion 36 may be securely fastened to that portion of panel 10 and its sheet material 16 which underlies extended portion 36.

The scale is manufactured for sale in two sections—one section having the flexing tongue 20, while the other section has the extended portion 36. The sections are preferably rigid as above described, and of a thickness capable of disposing their outermost faces in a plane beyond the offset members 22 and 24 normally forming a part of a door casing or room wall.

When an infant or young child is to be measured periodically, primary panel 10 is secured to wall 14. Such securement occurs only after the owner has stretched flexible section 20 its fullest length and has placed the free end thereof upon the surface where the child will stand when measurement occurs. The flexible section 20 in the illustrated instance, is substantially 15 in. in length and when the panel 10 is affixed, the first indicia or inch designation 18 will be "15," and a child must be at least 15 in. in height before measurement can occur.

After panel 10 has been mounted, flexible section 20 may be torn along the line of weakness 30 and discarded, or it may be rebent upon panel 10 as illustrated in Fig. 3 to preserve the same in the event the scale is to be shifted to another location.

The uppermost inch designation on panel, as illustrated in the drawing, is 49 in. and when a growing child has reached that height, the supplemental panel 32 is placed in longitudinal alignment with panel 10 and with extended portion 36 overlapping the upper part of panel 10. The indicia on the extended portion 36 registers with the indicia on panel 10—in other words, the number "49" on the extended portion 36 will overlie the number "49" on panel 10 when the supplemental panel is to be brought into use.

The indicia of supplemental panel 32 are in continuation of the inch designations of panel 10, and as shown herewith, a growing person may be then measured to a height of 73 in. if desired.

The panels 10 and 32 are provided with columns as illustrated in Fig. 4, headed "Height," "Date," and "Weight" respectively, for the purpose of providing a space within which data may be entered when the growing child reaches any given indicia on the scale. Supplemental data, such as a chart 42, may be printed upon the face of both panels and as shown in the illustrated embodiment, the chart of panel 10 may be completely covered by the extended portion 36 when the supplemental panel 32 is needed.

Obviously, a chart made as specified embodies the broad objects and concepts of the invention, and since the chart may embody specific structural details different from those illustrated, it is desired to be limited only by the scope of the appended claims.

Having thus described the invention, what is claimed as new and desired to be secured by Letters Patent is:

1. A measuring scale of the type described comprising a rigid primary panel having indicia on one face thereof; means for securing the panel to a wall; and a flexible section of predetermined length extending longitudinally from the primary panel to serve as means for locating the primary panel on the wall.

2. A measuring scale of the type described comprising a rigid primary panel having indicia on one face thereof; means for securing the panel to a wall; and a flexible section of predetermined length extending longitudinally from the primary panel to serve as means for locating the primary panel on the wall, said flexible section having a line of weakness formed transversely thereacross at its zone of juncture with the primary panel.

3. A measuring scale of the type described comprising a rigid primary panel; a facing of flexible sheet material on the panel; indicia on the facing; means for securing the panel to a wall; a section, formed of said flexible sheet material of predetermined length extending longitudinally from the primary panel to serve as means for locating the primary panel on the wall.

4. A measuring scale of the type set forth in claim 3, wherein the said section is relatively narrow and provided with indicia indicating its length.

5. A measuring scale of the type described comprising a primary panel; indicia on one face of the panel; means for securing the panel to a wall; an auxiliary panel of predetermined length, removably secured to the panel and extending longitudinally from one end thereof for locating the primary panel on the wall; and indicia on one face of the auxiliary panel indicating the length thereof in inches, the indicia on the main panel being in inch designations and continuing upwardly from the lower end thereof when the panel is in place on the wall, the first inch designation at the lower end of the panel indicating the height of that designation from the free end of the auxiliary panel.

6. A measuring scale of the type set forth in claim 5, wherein the primary panel is rigid and formed of relatively thick material and the auxiliary panel is relatively thin, extends from the indicia bearing face of the primary panel and is flexible whereby to provide an offset portion capable of bridging any irregularities on the wall between the lower end of the primary panel and the floor.

7. In a measuring scale of the type described, a primary panel having indicia on one face thereof; means for securing the panel to a wall; a supplemental panel adapted for mounting on the wall, in longitudinal alignment with the primary panel; and an extension overlapping the joint between the primary panel and said supplemental panel, said extension having indicia thereon and being integral with one of the said panels, the indicia of the extension being identical with the indicia of the other panel which it overlaps.

8. In a measuring scale of the type described, a primary panel having indicia on one face thereof; means for securing the panel to a wall a predetermined height above the floor; a supplemental panel adapted for mounting on the wall in longitudinal alignment with the primary panel and thereabove; and a sheet of material longer than the supplemental panel secured to the face thereof, said sheet of material having indicia thereon, the indicia on that portion of the sheet extending beyond the primary panel being identical with and overlying the indicia of the primary panel when the said panels are in the operative position on the wall with their proximal ends in abutting relation.

LLOYD M. WHEELER.